United States Patent [19]

Wilner

[11] 4,065,970
[45] Jan. 3, 1978

[54] DIFFUSED SEMICONDUCTOR PRESSURE GAUGE

[75] Inventor: Leslie B. Wilner, Palo Alto, Calif.

[73] Assignee: Becton, Dickinson Electronics Company, San Juan Capistrano, Calif.

[21] Appl. No.: 687,204

[22] Filed: May 17, 1976

[51] Int. Cl.² .............................................. G01L 9/06
[52] U.S. Cl. .................................... 73/727 R; 338/4; 338/42
[58] Field of Search .................. 73/398 AR, 88.55 D, 73/406; 338/4, 5, 42

[56] References Cited

U.S. PATENT DOCUMENTS

| | | | |
|---|---|---|---|
| 3,341,794 | 9/1967 | Stedman | 73/398 AR |
| 3,520,191 | 7/1970 | Pien | 73/398 AR |
| 3,697,918 | 10/1972 | Orth et al. | 73/398 AR |

Primary Examiner—Donald O. Woodiel
Attorney, Agent, or Firm—Reed C. Lawlor

[57] ABSTRACT

A diaphragm for a miniature pressure transducer has its surface sculptured by anisotropic etching to provide gauge areas in the form of narrow thin flexure areas between thick areas in the form of islands or motes. The thick areas act to constrain or stiffen the flexure areas from bending along their lengths while facilitating the bending thereof about axes parallel to their lengths when the diaphragm deflects in response to a pressure change. Linear piezoresistive gauges diffused into the gauge areas are responsive to the bending of said flexure areas to change resistance by an amount corresponding to the pressure change.

29 Claims, 12 Drawing Figures

DIFFUSED SEMICONDUCTOR PRESSURE GAUGE

CROSS REFERENCES TO RELATED APPLICATIONS

Patent application titled SCULPTURED PRESSURE TRANSDUCER 686,419, filed on May 14, 1976.

INTRODUCTION

This invention relates to miniature pressure transducers having piezoresistor gauges diffused into the diaphragm thereof and more particularly to such a transducer that has a diaphragm that is contoured to concentrate and control the induced stress in the areas of the piezoresistor gauges and to apply substantially uniaxial stresses to the piezoresistor gauges.

BACKGROUND OF THE INVENTION

The art of fabricating pressure transducers by diffusing piezoresistor gauges into a semiconductor diaphragm (usually silicon) is well known. However, prior art devices have usually employed plane circular diaphragms having large areas of uniform thickness for converting the pressure of a fluid to be measured to stress the gauges. Transducers employing diaphragms having flexures of reduced thickness are shown in Pien U.S. Pat. No. 3,520,191 and in copending patent application Serial No. 686-419, filed on May 14, 1976. Additional examples of prior art pressure gauges employing diaphragms that have some portions that are thick and some that are thin include Stedman U.S. Pat. No. Re. 25,924, and Stedman U.S. Pat. No. 3,341,794.

GENERAL STATEMENT OF INVENTION

The present invention provides a pressure transducer which utilizes large rigid areas and narrow flexible grooved areas alternately arranged on a surface of a sculptured silicon diaphragm to concentrate the stress in the narrow areas in which diffusion strain gauges are located. The narrow grooves form thin flexures in which stress is concentrated. The stress is uniaxial and is concentrated in a direction parallel to the widths of the grooves. The gauges are formed with certain of their axes parallel to the bend axes of the flexures formed in the narrow areas so as to maximize their effective gauge factors. Thus, as stress is concentrated in the gauges, the relative stress is reduced in the enlarged portions of the diaphragm. While stresses in the prior art plane circular diaphragms of uniform thickness are widely distributed and biaxial, in the diaphragm of the present invention the stresses are concentrated and these concentrated stresses are substantially uniaxial. Maximum gauge factor is achieved by employing a (100) crystal with the flexures along the [110] axis and arranging the length of the piezoresistor gauges either parallel to or normal to the [110] axis of the etched crystal. This advantage is achieved by etching the crystal in such a way that the grooves are parallel to or perpendicular to the [110] axis. The [110] axis may also be regarded as a [1̄10] axis.

One feature of the present invention resides in the use of anisotropic etching to form the sculptured diaphragms.

Another feature of the pressure transducers of the present invention is that a smaller mechanical input energy is required to achieve a given level of stress in diffused piezoresistor gauges than in diffused gauges on a plane circular diaphragm, because very little stress energy is applied to ungauged portions of the diaphragm.

Another feature of the present invention involves the fact that the orientation of the diaphragm crystal, the axis of bend of the flexures, and the orientation of the piezoresistors in the groove maximize the piezoresistive response.

The orientation of silicon which is particularly suited to shaping a substrate by anistropic etching is the (100) plane. P type gauges in this plane have maximum sensitivity if oriented in the [110] direction. Consequently, such a gauge displays an opposite sensitivity to a transverse stress. Stresses along the two axes thus tend to produce opposing changes in resistances of such a gauge. Thus, as an extreme example, such a gauge in the middle of a plane circular diaphragm would be subject to equal and opposite orthogonal stresses and hence would produce no response at all.

In the present invention, narrow straight flexible areas between stiffened areas serve as gauge areas. The narrow areas form flexures. Such a flexure bends around an axis parallel to its length, but is stiff along its length. In the structure of this invention the stress axis is normal to the length of the flexure and "parallel" to the surface of the diaphragm. Piezoresistor gauges are formed by diffusion in the flexures. In the best embodiment of the invention the length of the flexure and its diffused gauge are aligned in the [110] direction of the crystal and both are parallel to the rotation axis of the flexure. Since the direction of current flow is along the length of the flexure, the stress is transverse to the gauge. And there is substantially no stress along the length of the gauge.

In the description, a piezoresistive gauge is sometimes referred to as longitudinal if its length is parallel to the stress axis of the flexure in which it is formed, and is referred to as transverse when its length is normal to the stress axis. In either event, as mentioned above, the current that is employed to detect changes in resistance of a gauge flows along the length of the piezoresistive gauge.

In general the direction of current flow is perpendicular to the stress and parallel to the bend axis when the gauge is transverse and is parallel to the stress and perpendicular to the bend axis when the gauge is longitudinal.

Stated differently, a resistor is called transverse when the current flows along its length in a direction transverse to the stress, and is called longitudinal when the current flows along its length in a direction parallel to the stress axis. Another feature of the transducer of the present invention lies in the provision of a piezoresistive pressure transducer with integral diffused gauges having improved linearity characteristics. These improved characteristics result from pairing of gauges, having large but known uniform nonlinearities, in such a way as to balance and nullify the nonlinearity components of their response but to add the linear components. The curvature of the resistance-stress curves of these combinations of gauges are so uniform that if gauges in equal and opposite stress fields are paired as a half Wheatstone bridge, the nonlinearity components may be substantially balanced out.

Other objects and features of the invention will become apparent to those skilled in the art from the following description of the preferred embodiments of the

DESCRIPTION OF PREFERRED EMBODIMENTS

Figure 4:
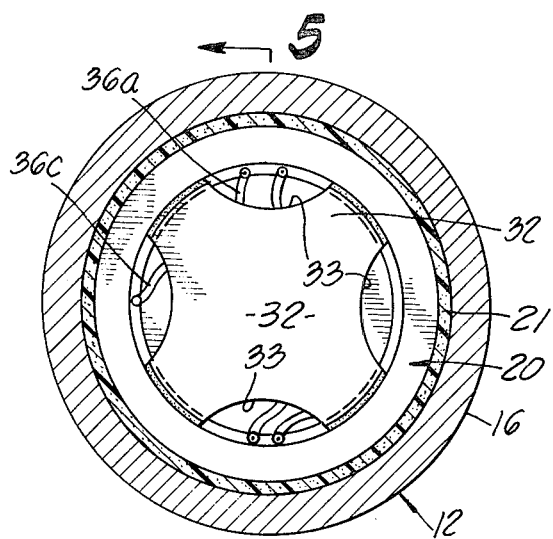
FIG. 4 is an enlarged cross-sectional view as taken along the line 4—4 in FIG. 3.
Figure 5:
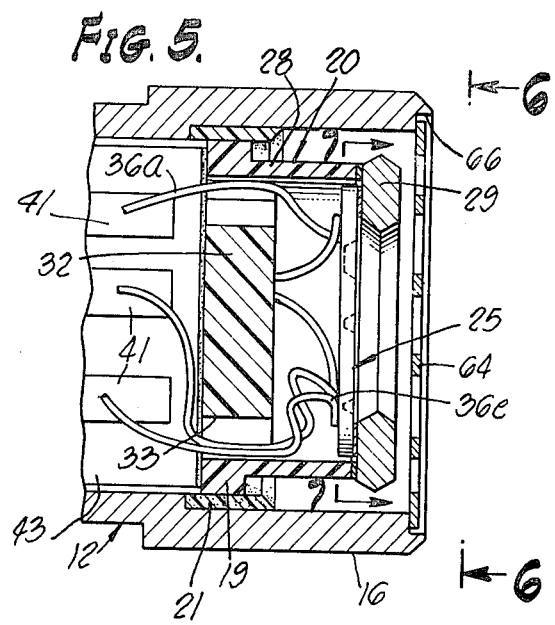
FIG. 5 is an enlarged cross-sectional side view of the tip portion of the improved pressure transducer of FIGS. 1 to 4.
Figure 6:
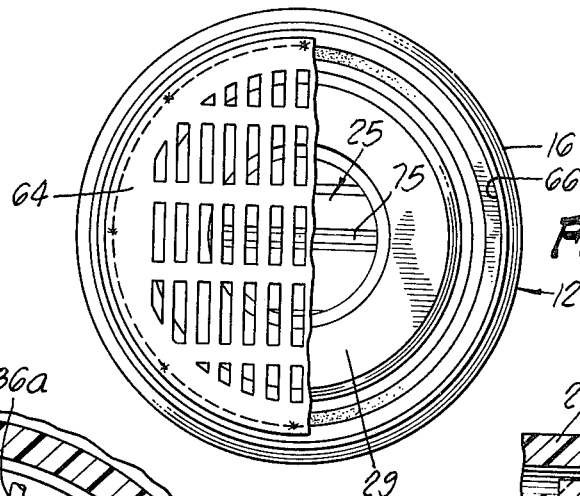
FIG. 6 is an end view of the pressure transducer as taken along the line 6—6 in FIG. 5.

Referring to the drawings, the miniature pressure transducer 10 of the present invention comprises a casing or housing 12 having a central threaded portion 13 with an enlarged portion 15 on the rear end thereof shaped in the form of a hexagonal nut and an active end portion 16 on the front, or head, end thereof. A bore 17 extends through the longitudinal axis of the housing. The active end portion 16 encloses a pressure transducer sensor assembly 20. The assembly 20 comprises a mounting tube 28 having a diaphragm 25 in the form of a silicon chip cemented on the outer end thereof. A spacing hub 32 (see FIG. 4) having four equally spaced arcuate cutouts 33 on its periphery is cemented on the inner end of the mounting tube 28. A silicon support ring 29 is cemented on the outer end of the mounting tube 28 with its face butting up against the flat rim of the diaphragm 25. A flange 19 on the inner end of the mounting tube 28 is cemented to the end portion 16 by a thick cylindrical body 21 of epoxy. The mounting tube 28 mechanically isolates the silicon ring 29 and the diaphragm 25 from the mounting flange 19.

Five wire leads 36a–36e whose inner ends are soldered, or otherwise connected to the back surface of the diaphragm 25, pass through cutouts 33 of the hub 32. These wire leads connect to conductive strips 41 on a circuit board 43 which resides in the bore 17. Included on the circuit board 43 are elements that balance a bridge circuit provided on the diaphragm 15 and compensate for both zero-level and sensitivity changes with temperature. External wires 51 leading from the printed circuit board 43 are connected to a power supply 113 and external recording system 114. The end of the printed circuit board closest to the diaphragm is cemented to the spacing hub 32.

The cementing of the diaphragm 25 to the ring 29 is accomplished with glass. The cementing of the ring 29 to the mounting tube 28, and the cementing of the printed circuitboard 43 to the spacing hub 32, is accomplished by means of epoxy. The thickness of the cement layers is highly exaggerated in the drawings.

Figure 1:
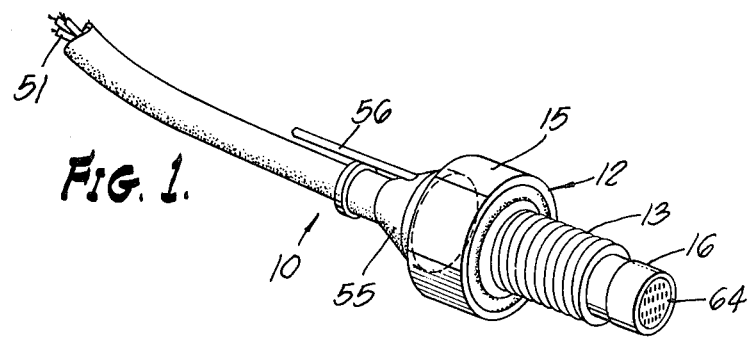
FIG. 1 is a slightly enlarged perspective view showing a miniature pressure transducer that embodies the present invention.
Figure 2:
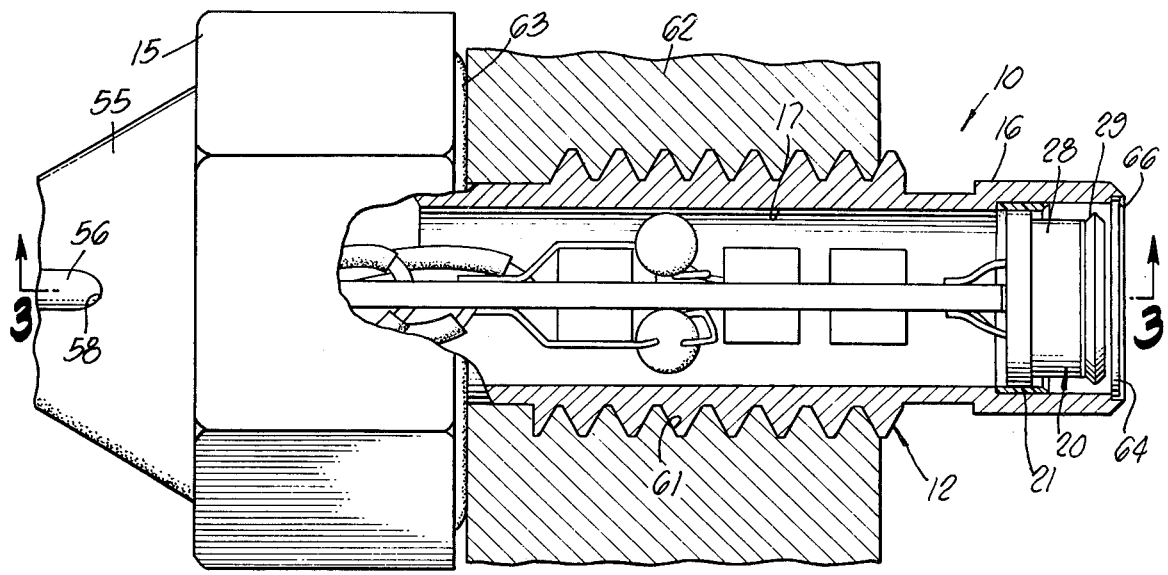
FIG. 2 is an enlarged cross-sectional top view of the miniature pressure transducer of FIG. 1.
Figure 3:
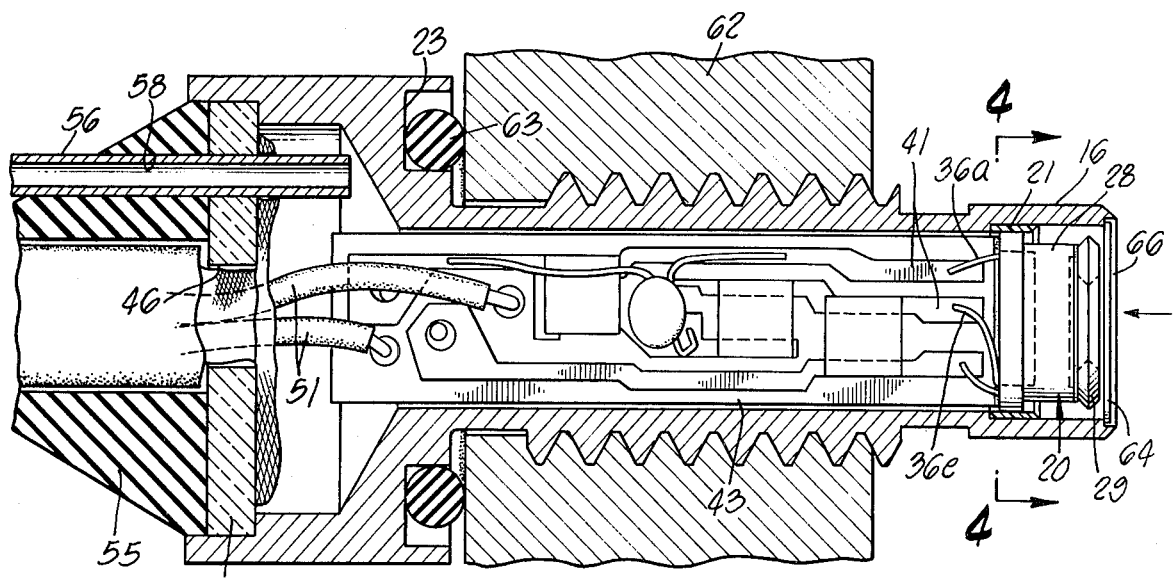
FIG. 3 is an enlarged cross-sectional side view of the miniature pressure transducer of FIG. 1 taken on the line 3—3 in FIG. 2.

As shown in FIG. 3, within the enlarged end bore of the nut portion 15 of the housing 12 is an end plate 53 having a central opening 46 through which the external wires 51 pass. A fitting 55 for a cable enclosing the wires 51 is provided on the rear of the housing. A metal capillary vent tube 56 extends through the fitting 55 and the end plate 53. The vent tube 56 provides access to the interior of the transducer housing 12 so that the pressure on the back surface of the diaphragm 25 can be established at a predetermined value relative to the pressure of the ambient fluid. Thus, if the vent tube remains open, the interior pressure is equal to the average pressure of the ambient fluid. But the tube may be connected to a source of gas under pressure or to a vacuum system to maintain the pressure within the instrument at a predetermined value different from that of the ambient fluid. By employing a capillary tube that is very long compared with its diameter and by utilizing a tube of very small diameter, the viscous effects prevent the cavity within the transducer housing from resonating with the fluid column in the capillary tube in Helmholz-resonator fashion, and still permit the pressure within the cavity to vary very slowly if the average pressure of the ambient fluid is drifting. Under these conditions, the pressure transducer responds uniformly to rapidly changing pressures over a wide frequency range below the resonant frequency of the diaphragm.

A screen 64 is mounted on the front end of the housing 12 and held in the recess 66. The screen prevents large particles from flowing into the space in which the diaphragm 25 is mounted.

When the miniature pressure transducer 10 of the present invention is mounted for use, the threaded portion 13 of the housing 12 engages a threaded opening 61 in a wall 62 of the enclosure containing the fluid whose pressure is to be measured. The front wall of the nut portion 15 of the transducer housing 12 is provided with an annular slot 23 to receive an O-ring for sealing the threaded opening 61.

Figure 7:
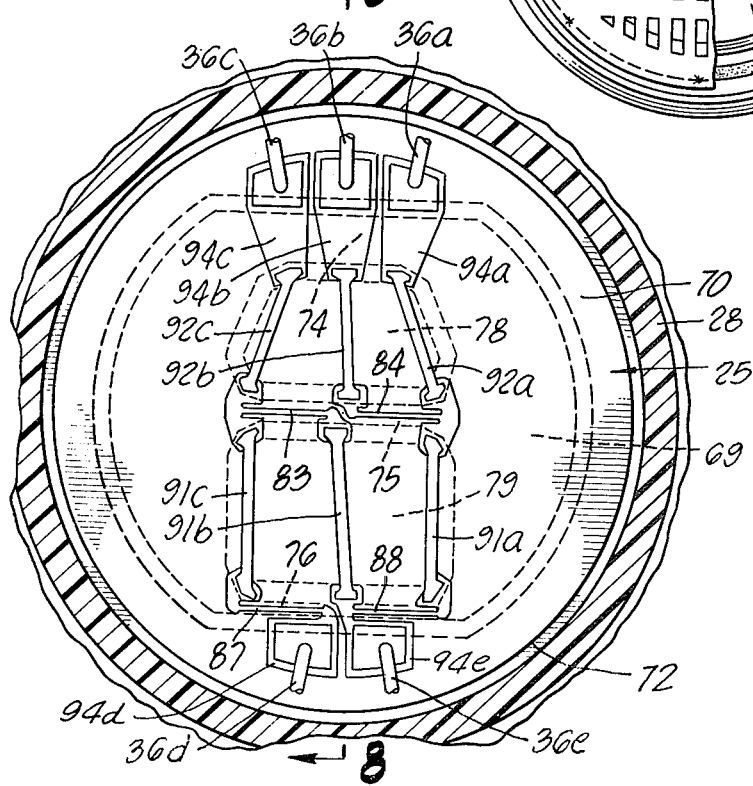
FIG. 7 is an enlarged end view of one preferred form of silicon ship strain gauge bridge pattern arrangement.
Figure 8:
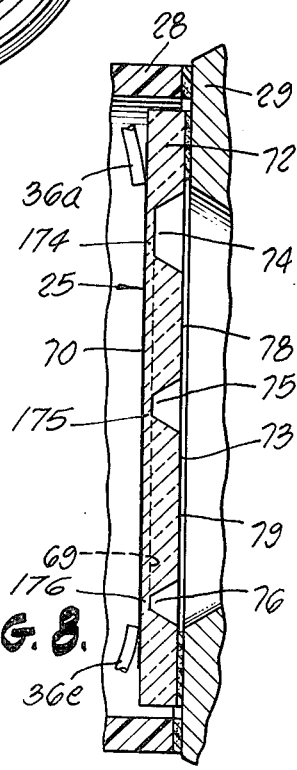
FIG. 8 is an enlarged sectional view as taken along the line 8—8 in FIG. 7.
Figure 9:
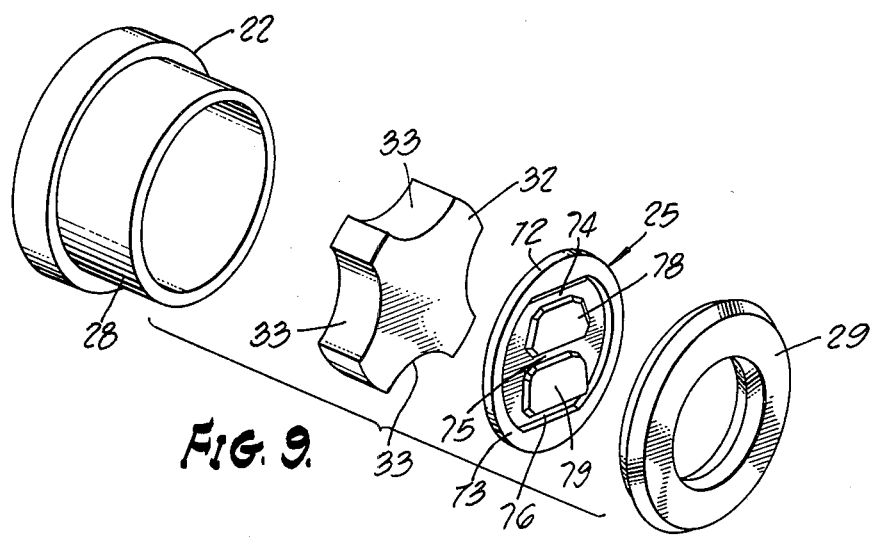
FIG. 9 is an exploded view of the parts of the pressure transducer with the lead wires eliminated for clarity.

An enlarged view of one preferred form of the silicon chip that comprises the diaphragm 25 is shown in FIGS. 7 and 8. The inner and outer surfaces of the circular silicon chip are initially both flat. During the fabrication thereof portions of its front surface are etched away by using photoresist techniques and an appropriate etching bath to form a thin walled central support portion 69 inwardly of the rim 72 thereof having islands or motes 78 and 79 integrally formed on opposite sides of a diameter thereof. The islands are shaped such that adjacent sides thereof, as well as the respective outer sides of the islands and the adjacent sides of the rim 72, are all straight and "parallel" to each other so as to define a central groove 75, and outer grooves 74 and 76.

Two aligned piezoresistive lineal, that is, narrow, gauge elements hereinafter also referred to as transverse gauges 83 and 84, are formed by diffusing boron or other suitable doping material, into gauge areas on the flat surface 70 of the diaphragm 25 directly opposite the central groove 75. In addition, two aligned piezoresistive narrow gauge elements, hereinafter also referred to as transverse gauges 87 and 88, are formed by diffusing boron into gauge areas on the flat surface 70 opposite the groove 76 of the diaphragm 25. The diffusion of the doping material into the surface causes the doping material to be dispersed in a shallow lineal region of the silicon crystal, thus reducing the electrical resistivity of that region.

The initial Silicon is n-type and parts of it are converted to p-type by addition of boron. Other dopant materials such as aluminum, indium, gallium, and thalium may be employed for converting the silicon to p-type. Diaphragms may also be made from other substrate materials such as germanium into which a suitable doping material has been diffused.

As will be discussed hereinafter, the four transverse gauges 83, 84, 87, and 88 are interconnected by low resistance conductors, or leads, deposited on the diaphragm surface 70 to form a Wheatstone bridge pattern in a well known manner.

The diaphragm 25 is made of a single silicon chip of N type material having plane surfaces oriented in the (100) direction. In forming the diaphragm, a photoresistive layer is placed on the previously oxidized front surfaces 73 of the chip. A mask or transparency having opaque patterns thereon corresponding to the thin walled portion to be etched on the front surface of the diaphragm is placed over the photoresistive layer. The longitudinal axes of the groove patterns are disposed in the [110] direction of the chip. The chip with the mask is then exposed to ultraviolet radiation. This polymerizes the photoresistive layer in the transparent areas of the mask. The unactivated photoresistive material is then removed, permitting a suitable etch to be used to etch away the silicon oxide surface. The pattern of oxide surface so formed serves as a mask to etch the silicon diaphgram. The etching process is continued until the silicon is etched away to the desired depth to form the islands 78 and 79.

It should be especially noted that the crystallographic orientation chosen for the silicon chip used to form the diaphragm 25 is the (100) plane since such orientation is particularly suited to shaping by anisotropic etching. Such an etch is desirable since it forms the sides of the islands 78 and 79 with sloped walls having sharp edges at their roots where they intersect the flexures. Because the flexures are of uniform thickness, the stress is uniform over the entire widths of the flexures. Furthermore, excellent dimensional control of the etching of the small, intricate profiles are achieved in this way.

Having formed the desired contour on the front, or outer, surface 50 of the chip, the bridge pattern is next formed on the opposite flat surface 70 by means of three photoresist stages of well known types.

In the first photoresist stage, the silicon chip is oxidized and a photoresistive layer is applied thereto. A mask, or transparency, having opaque images corresponding to the shape of the narrow transverse gauges 83, 84, and 87, 88, is placed on the back surface of the substrate such that the opaque images are aligned parallel to the axes of the grooves 75 and 76 on the opposite surface thereof and substantially centered between the sides and ends of the grooves. The mask is then exposed to ultraviolet radiation which serves to activate, i.e., polymerize, the photoresistive material except in the opaque gauge areas. The unactivated photoresistive material is then removed to expose the gauge areas, permitting a suitable etching solution to be applied to remove the silicon dioxide layer down to the inner surface 51 of the chip. The chip is then placed in a furnace to enable boron, which is a P-type dopant, to be diffused into the surface thereof to a controlled depth.

The mask employed in the first photoresist stage also provides opaque areas which enable the formation of lugs at the ends of the piezoresistors 83, 84, 87, and 88 as shown, and conductor pads 94a, 94b, and 94c, and conductor pads 94d and 94e. At this point it will be noted that the conductor pads 94a, 94b, and 94c, which are at the upper end of the diaphragm, are electrically isolated from each other and from the piezoresistors. It will also be noted that at this time, the pads 94d and 94e which are located at the lower end of the diaphragm, are electrically connected to the inner ends of the two piezoresistors 87 and 88.

In the next photoresist stage, which is carried out in the same manner as the first photoresist stage described above up to the point where boron is diffused into the substrate, windows are formed in order to provide for electrical connections between the various piezoresistors and pads previously deposited. More particularly, such windows are formed at the upper and lower extremeties of the pads 94a, 94b, and 94c and on the pads 94d and 94e and also on the lugs that have previously been formed at the extremeties of the piezoresistors 83, 84 and 87, 88.

Thereupon, the diaphragm is subjected to a third photoresist stage to deposit low resistance interconnecting conductors, or leads, 91a, 91b, and 91c and terminal conductors, or leads, 92a, 92b, and 92c. In this photoresist stage, a thin layer of aluminum is vaccum deposited, or evaporated, onto the entire back surface 70 of the chip including the boron doped areas where the four gauges have been formed. An azo-photoresistive layer is then placed over the aluminum layer. A mask having a dark image corresponding to the interconnecting leads, the terminal leads and the terminal pads, but with the remainder thereof transparent, is placed on the surface of the chip. The chip with this mask is then exposed to ultraviolet radiation causing the photoresistive material to be activated in the transparent areas. The activated photoresistive material is then removed permitting a suitable etching solution to be applied to remove the aluminum from the areas that are not to serve as conductors.

Figure 7A:
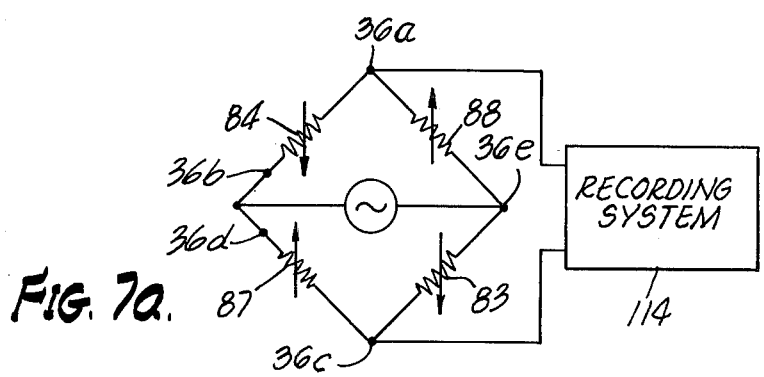
FIG. 7a is a schematic circuit diagram of a Wheatstone bridge formed by the bridge pattern arrangement of FIG. 7.

To complete the fabrication of the silicon chip comprising the diaphragm 25, wire leads 36a, 36b, and 36c are soldered or otherwise connected to the respective terminal pads, or conductors, 94a, 94b, and 94c. In addition, wire leads 36d and 36e are soldered to the respective enlarged terminal portions 94d and 94e at the ends of the gauges 87 and 88. The wire leads 36a-36e extend from the diaphragm 25 through the spacing hub 32 to connect to the electrical conductor strips 41 on the printed circuit board 43. The printed circuit board provides for connecting the wire leads 36b and 36d together. In addition, the printed circuit board 43 provides for connecting wire leads 36a and 36c to a meter or recording system and wire leads 36b, 36d, and 36e to a power supply, to form a Wheatstone bridge as shown, for example, in FIG. 7A.

It is evident that the two islands 78 and 79 formed on the front surface of the diaphragm 25 are quite rigid. The flexures 174, 175, and 176 formed at the roots of the respective grooves 74, 75, and 76, bend or flex easily in a direction about axes parallel to the lengths thereof. But they are constrained or stiffened by the islands against bending about a direction normal to their lengths. When such flexing of the diaphragm occurs, the change in the angle between the opposing walls of the center groove 75 is twice the change in the angle between the opposing walls of the two outer grooves 74 and 76. Thus, in order to equalize the stress in the active flexures 175 and 176 opposite the two active grooves 75 and 76, the central, active, flexure 175 is made twice as wide as the outer active flexure 176. This proportioning of the widths provides the same curvature and the same level of stress in the flexure at the central flexure 175 as in the outer active flexure 176. Further, in order to render the idle flexure 174 lightly stressed, it is made several times wider than the central flexure 175. This helps to concentrate the stress in the two active flexures, that is, the flexures that have gauge elements formed in them.

It should now be clearly understood that as a result of the rigidity of the diaphragm 25 created by the islands 78 and 79 and the location of the gauge elements relative to the middle flexure 175 and the outer flexure 176, the strain in these flexures, as a result of the deflection of the diaphragm, lies in a direction transverse to the length of the groove and hence transverse to the direction of current flow in the gauges. Furthermore, it should now be understood that the transverse gauges 83 and 84 located opposite the central groove 75 experience stress of one sense and the transverse gauges 87 and 88 located opposite the outer groove 76 experience an equal stress of opposite sense.

In a practical embodiment of the invention, the silicon diaphragm had a diameter of 0.085 inches and an initial (pre-etched) thickness of 0.005 inches. The etching was carried out to produce a flexible sheet thickness in the etchedaway portions of 0.00075 inches. The widths of the three grooves at their roots were approximately 0.00092 inches, 0.0026 inches, 0.006 inches and because of the anistropic etching process employed, the slopes of the walls at the edges of the grooves and other recessed portions was 35° measured from the normal to the surface. The lengths of the inner and outer grooves were approximately 0.015 inches. The values of resistances of the piezoresistor elements that have been employed in the present invention (with no pressure applied to the diaphragm) have extended over a range from about 100 ohms to about 3000 ohms.

The widths of the blank spaces of the masks through which the doping material was diffused into the silicon in the two flexures 75 and 76 were 0.0003 inches. By employing shark grooves that result from anisotropic etching, the stress produced by the deflection of the diaphragm is uniform across the widths of the flexures. Because the stress is uniform throughout the width of each flexure, slight errors in the location of the piezoresistive gauges on the flexures do not seriously affect their sensitivity. In this connection, it is to be noted that if the edges of the grooves are not sharp but are curved, as are the grooves in the aforementioned copending patent application Serial No. 686,419, filed May 14, 1976 the stresses are not uniform throughout the widths of the flexures.

Figure 10:
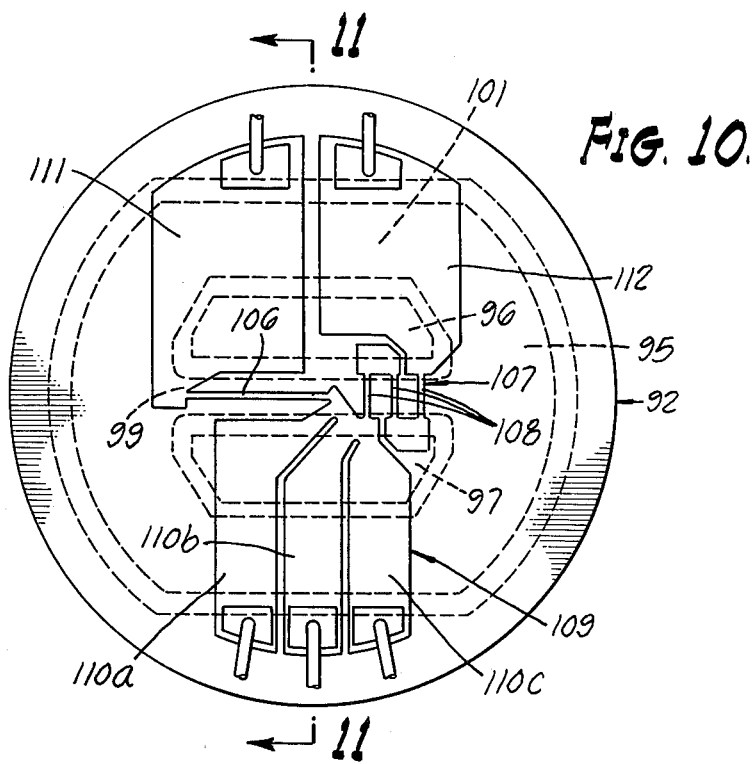
FIG. 10 is an enlarged end view of another preferred form of the silicon chip strain gauge bridge pattern arrangement.
Figure 11:
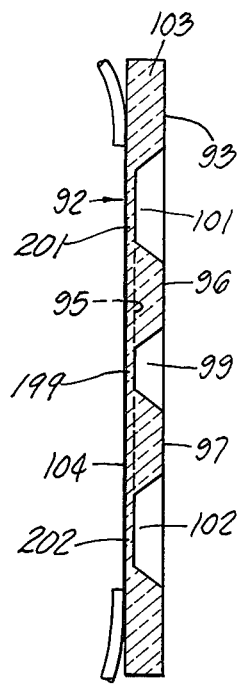
FIG. 11 is a sectional view taken along the line 11—11 in FIG. 10.

Referring to FIGS. 10 and 11, a modified diaphragm 92 is shown for use with the pressure transducer 10 of the present invention. In this embodiment, as before, the front flat surface 93 of a silicon chip is etched away using photoresistive techniques to form a central thin wall portion 95 with integral islands 96 and 97 formed on either side of a diameter thereof so as to provide a relatively narrow central groove 99 and two relatively wide outer grooves 101 and 102. The thin sheet portions of the diaphragm adjacent the grooves 99, 101 and 102 act as flexures 199, 201 and 202.

In this embodiment, narrow, that is lineal, gauge areas are diffused only in the flexure 199 formed in the thin wall portion 95 of the back surface 104 opposite the central groove 99. A single gauge 106 comprising a narrow strip extending parallel to the length of the groove 99 is diffused on one half on the thin wall portion opposite the groove 99 and a single gauge 107 comprising three serially connected narrow strips 108 extending in an orthogonal direction relative to the length of the groove 99 is diffused on the other half of the thin wall portion opposite the groove 99, i.e., the path of the gauge 107 zigzags back and forth across the groove to provide a length therefor equivalent to that of the longitudinal gauge 106. It is to be noted that the active groove 99 is made wider than the active groove 75 in FIG. 8 to provide a wider active gauge area across which the narrow strips 108 may extend.

One enlarged terminal portion 111 of the transverse gauge 106 extends outwardly toward one side of the rim 103 of the silicon chip. The other enlarged opposite terminal end portion 109 of the transverse gauge 106 extends outwardly toward the opposite side of the rim and divided to form three terminal pads 110a, 110b, and 110c. In addition, terminal end portion 109 is integrally connected to one end of the longitudinal gauge 107. The enlarged opposite terminal end 112 of the longitudinal gauge 107 extends outwardly toward the rim on the same side of the diameter as the terminal portion 111. The terminal ends of the chip enable gauges 106 and 107 to be connected to form a half Wheatstone bridge which is then further connected by the terminal pads to circuit components on a printed circuit board which forms the other half of the bridge.

It should be noted that in FIGS. 10 and 11, both longitudinal and transverse gauges can be diffused into a single flexure 199 of the diaphragm 92. It should be pointed out, however, that such an arrangement produces nonlinearities in the output signal for which adjustment must be made by external circuitry or otherwise accepted as providing a useful signal.

It should now be understood that either transverse gauges or longitudinal gauges may be provided on the surface of the diaphragm which has been contoured with grooves to form islands and interconnecting flexures such that it will exhibit uniaxial stresses in active flexures. The transverse gauges are preferable, however, since although they are individually more nonlinear than longitudinal gauges, their nonlinearity is uniform and when transverse gauges in opposite and equal stress fields are properly balanced they are more linear over a relatively longer stress range than longitudinal gauges.

Another advantage of using transverse gauges, as is now evident from FIGS. 10 and 11, is that the transverse gauges permit a very small area of stressed silicon to be used since they can be threaded along the length of the narrow area opposite the groove, as compared with the zigzagging and relative wider gauge area required to form a longitudinal gauge of equivalent length.

It should now be clear that the contouring of the diaphragm of the present invention provides for a uniaxial stress field in the diaphragm by substantially eliminating the stress in the orthogonal direction of the diaphragm which normally exists when a plane circular diaphragm is employed in the pressure transducer. Thus, in fact, when employing a diaphragm with the surfaces in the (100) plane and the grooves along the [110] axis, if the islands, such as islands 96 and 97, were not present on the surface of the diaphragm 104 in FIG. 10 to nullify stress in this other orthogonal direction, there would be no output whatsoever from the gauges diffused into the middle of the diaphragm. Each of the gauges would sustain no resistance change because its resistance would be subject to a positive change from stress in one direction of stress and an equal but negative change from stress in the other, orthogonal, direction. So it is desirable to confine the stress as much as possible to only one of the two directions of stress so as to achieve a uniaxial stress, and it is by the contouring of the surface of the diaphragm that this result is achieved in the pressure transducer of the present invention.

The particular orientation described is especially useful when silicon is employed because it attains the advantage of relatively simple and inexpensive anistropic etching while at the same time providing for high gauge sensitivity.

By employing transverse gauge elements, narrower and hence stiffer flexures may be provided thus making it possible to achieve higher resonant frequencies for the diaphragm. Higher resonant frequencies have the advantage that it becomes possible to attain a sensitivity to pressure over a higher frequency range than would otherwise be the case.

The piezoresistors have been described above as being produced by a diffusion process. In a second process, the dopant is deposited by ion implantation. In a third process, the piezoresistors may also be formed by an epitaxial process. In this case, the piezoresistors are in the form of raised elements. In all three processes, the dopant is in solution, that is, scattered or dispersed or suspended, in the carrier or matrix material, sometimes called a substrate. Even in this case, the active surface of the diaphragm is substantially flat.

In still another way of practicing the invention, the sculptured substrate may be composed of an insulating material, such as sapphire and the piezoresistors may be formed by epitaxial deposition of semiconductive material on the flexures of that substrate. As used in the claims, the term "insulating material" is intended to include semiconductive materials having high resistivity, and the term "semiconductive carrier material" is intended to mean semiconductive material that has a relatively high resistivity which may be lowered by dissolving a dopant therein such as by one of the processes described above.

Methods of anisotropic etching of the type referred to above are widely known and have been described in the literature, for example, in:

1. "Anisotropic Etching of Silicon", Lee, D. B., *Journal of Applied Physics*, Vol, 40, No 11, October 1969.
2. "Correlation of the Anistropic Etching of Single-Crystal Silicon Spheres and Wafers", Weirauch, Donald F., *Journal of Applied Physics*, Vol. 46, No. 4, April 1975.
3. "An IC Piezoresistive Pressure Sensor for Biomedical Instrumentation", Samaun, Wise, Kensall D. and Angell, James B., IEEE *Transactions of Biomedical Engineering*, Vol. BME-20, No. 2, March 1973.

The lattermost article describes the application of the anistropic etching process to a pressure diaphragm of uniform thickness.

In the best embodiment of the invention, the gauge lies on the surface of the silicon diaphragm with its length transverse to the direction of stress which is employed. It is because the transverse gauge is dissolved in the silicon diaphragm that it can be operated in the manner disclosed. In contrast, extreme difficulty is experienced if an attempt is made to transmit stress sideways into a discrete gauge, such as a wire or foil gauge, which is bonded to a diaphragm surface. Such a discrete gauge simply does not respond, or if it does, it is characterized by large creep and large mechanical hysteresis. This is one of the significant advantages in dealing with dissolved rather than with bonded gauges.

While the foregoing disclosure has been concerned primarily with certain illustrative embodiments, it is to be understood that the invention is susceptible of many modifications and variations in both construction and arrangement, as well as having many other uses besides those disclosed herein. The present invention, therefore, is not considered as limited to the specific disclosure provided herein, but is to be considered as covering all modifications and variations falling within the scope of the invention as defined in the appended claims.

I claim:
1. In a pressure transducer,
    an edge restrained diaphragm of insulating material having portions of one surface thereof partially etched away to provide a thin portion having a pair of islands or thickened portions projecting therefrom to thereby define a longitudinal groove between the islands, whereby a flexure is formed between the islands, and
    electrical strain gauge means formed by a dopant in solution at the flexure, whereby the electrical resistance of said gauge means varies as a function of the pressure across said diaphragm.
2. A pressure responsive device comprising
    an edge restrained circular diaphragm composed of insulating material, said diaphragm having a substantially flat surface and having the opposite surface thereof partially etched away to provide a rim with a thin central portion having islands of thickened portions formed on either side of a diameter thereof to thereby define a longitudinal straight central gap between the islands, and to define longitudinal straight outer gaps between the respective outer sides of the islands and the rim, the thickened portions of the islands being operable to prevent said gaps from experiencing any substantial longitudinal bending thereby eliminating any longitudinal stress in said diaphragm when it responds to a force, and
    electrical strain gauge means having dopant in solution in said material in said surface of said diaphragm opposite said central gap and opposite one of the outer gaps.
3. In a pressure transducer,
    a diaphragm composed of a semiconductive carrier material, said diaphragm being contoured by etching to provide a thin sheet portion supporting two raised portions forming thick rigid islands spaced inwardly from a raised rim portion and said sheet portion including two thin flexure sections between adjacent raised portions, the spaces opposite said flexure sections between adjacent raised por- tions being in the form of elongated grooves, whereby deflection of said diaphragm causes said flexure sections to bend about axes parallel to their lengths, and lineal piezoresistive means composed of doping material in solution in said flexure sections and responsive to bending of said flexure sections to change resistance by an amount corresponding to a pressure change.

4. In a pressure transducer, a diaphragm composed of a semiconductive carrier material, said diaphragm being contoured by etching to provide a thin sheet portion supporting two raised portions forming thick rigid islands spaced inwardly from a raised rim portion, said sheet portion including two thin flexure sections between adjacent raised portions, the spaces opposite said flexure sections between adjacent raised portions being in the form of elongated grooves, whereby deflection of said diaphragm causes said flexure sections to bend about axes parallel to their lengths, said diaphragm being formed of a single crystal of silicon having its surfaces oriented in the (100) crystallographic plane, and lineal piezoresistive means composed of doping material in solution in said flexure sections and responsive to bending of said flexure sections to change resistance by an amount corresponding to a prssure change.

5. In a pressure transducer as in claim 4, wherein said flexure extends along in the crystallographic direction.

6. In a pressure transducer as defined in claim 4, wherein said grooves are elongated and the axes of said lineal piezoresistive means are parallel to the lengths of said groove.

7. In a pressure transducer as defined in claim 6, wherein a first pair of transverse lineal gauges is in the middle flexure section and a second pair of transverse lineal gauges is in an active one of the outer flexure sections.

8. In a pressure transducer as defined in claim 7, wherein said middle flexure section is twice as wide as the active outer flexure section, and the other outer flexure section is several times as wide as said middle flexure section.

9. In a pressure transducer as defined in claim 4, wherein said grooves and islands are formed by anisotropic etching.

10. In a pressure transducer as defined in claim 4, wherein said diaphragm is composed of a thin silicon crystal of the n-type and the lineal piezoresistive means is rendered p-type by boron.

11. In a pressure transducer, a pressure sensitive diaphragm composed of semiconductive carrier material and formed with a thick rigid rim having opposite straight parallel sides and a thin central portion having integrally formed thereon spaced inwardly of said sides of the rim two thick rigid islands, said islands having straight sides parallel to each other and to the sides of said rim to thereby define a middle elongated thin flexure section and two outer elongated thin flexure sections whereby deflection of said diaphragm causes said flexure sections to bend about axes parallel to their lengths, and a lineal gauge dissolved in at least one of the flexure sections and responsive to bending thereof to change resistance in accordance with the pressure change in said central portion.

12. In a pressure transducer as defined in claim 11, wherein a transverse lineal gauge and a multiple path longitudinal lineal gauge are diffused into the middle flexure section, and including conductor means for connecting said lineal gauges to form a half bridge circuit.

13. A pressure transducer comprising, a diaphragm composed of a semiconductive matrix material, said diaphragm being formed with a rim having opposite straight parallel sides, said rim surrounding a thin supporting portion having integrally formed thereon two spaced thick stiffening areas with straight sides parallel to the parallel sides of said rim to thereby define on said thin supporting portion a middle strain sensitive region and two outer strain sensitive regions which regions experience uniaxial bending stresses about axes parallel to said straight sides in response to a pressure change on said diaphragm, a first pair of lineal gauge elements diffused on said middle strain sensitive region, a second pair of lineal gauge elements diffused on an active one of said outer strain sensitive regions, conductive elements on said supporting portion for interconnecting said gauge elements, and circuit connecting means having electrical connection to the interconnecting conductive elements to form a Wheatstone bridge type of measuring circuit.

14. A pressure transducer as defined in claim 13, wherein said first and second pair of lineal gauge elements are transverse gauges, and whereby deflection of said diaphragm causes said middle strain sensitive regions to be subjected to one sense of strain and the active outer sensitive region to be subjected to the opposite sense of strain.

15. A pressure transducer as defined in claim 14, wherein the lineal gauge elements subject to the same sense of strain are arranged in opposite arms of the Wheatstone bridge.

16. In a pressure transducer as defined in claim 13, wherein the middle strain sensitive region has a width approximately twice that of the outer strain sensitive region into which lineal gauge elements have been defined and the other outer strain sensitive element is several times as wide as said middle strain sensitive region whereby the gauge elements in different regions are subjected to equal and opposite changes in strains when pressure is applied over the face of the diaphragm.

17. In a pressure transducer, an edge supported diaphragm composed of a semiconductive carrier material, said diaphragm having a pressure receiving portion contoured to provide rigid areas and flexure areas, said rigid areas being arranged relative to said flexure areas to concentrate uniaxial strains in the flexure areas when said diaphragm is subjected to a pressure change, and lineal piezoresistive gauges provided by dopant in at least one of said flexure areas and responsive to the bending of said one flexure area to change resistance by an amount corresponding to the pressure changes.

18. In a pressure transducer, a diaphragm composed of insulating material and having at least one strain gauge area thereon, said gauge area being in a narrow rectangular thin flexure area between stiffening areas, said stiffening areas constraining said flexure area from bending along its length, and an elongated semiconductive piezoresistive strain gauge secured to said diaphragm at said flexure area with its length extending along the length of said area, 'whereby deflection of said diaphragm causes said flexure area to bend about an axis parallel to its length whereby the resistance of said strain gauge varies in accordance with pressure applied to said diaphragm.

19. In a pressure transducer,
a diaphragm composed of a semiconductive material, said diaphragm being contoured by etching to have a thin portion supporting two raised portions forming thick rigid islands spaced inwardly from the periphery of said diaphragm and including a flexure section between two adjacent raised portions, the space opposite each said flexure section between adjacent raised portions being in the form of an elongated groove,
said islands providing for constraining said flexure section against bending along its length so that movement of the diaphragm in response to a pressure change takes place by said flexure section bending about an axis parallel to its length, and
a piezoresistor formed in said flexure section.

20. A pressure transducer as defined in claim 19, where said diaphragm is composed of silicon crystal and is contoured by anisotropic etching.

21. In a pressure transducer,
a diaphragm composed of insulating material and having at least one strain gauge area thereon, said gauge area being in a narrow rectangular thin flexure area between stiffening areas, said stiffening areas constraining said flexure area from bending along its length, and two semiconductive piezoresistive strain gauge elements formed at said flexure area, one having a current axis parallel to the length of said flexure area and the other having its current flow axis transverse to the length of said flexure area;
whereby deflection of said diaphragm causes said flexure area to bend about an axis parallel to its length whereby the resistance of said first mentioned strain gauge varies substantially with the pressure applied to said diaphragm and the resistance of said other strain gauge element does not vary substantially with the pressure applied to said diaphragm.

22. A pressure responsive device comprising:
an edge restrained circular diaphragm composed of insulating material, said diaphragm having a substantially flat surface and having the opposite surface thereof partially etched away to provide a rim with a thin central portion having islands of thickened portions formed on either side of a diameter thereof to thereby define a central intermediate flexure between said islands and to define a straight outer flexure between the first island and said rim and a second outer flexure between said second island and said rim, the island portions being operable to prevent said first and second flexures from experiencing substantial longitudinal bending thereby eliminating substantial longitudinal stresses in said flexure when said diaphragm responds to pressure, said second external flexure being wiser than said first external flexure whereby flexing is concentrated in said intermediate flexure and said first flexure, and strain-sensitive resistance means formed at said intermediate flexure and at said first external flexure.

23. In a pressure responsive device as defined in claim 22, wherein said insulating material is semiconductive and said resistance means is formed of dopant in solution in said material at said intermediate and said first external flexure.

24. In a pressure transducer as defined in claim 22, wherein said diaphragm is composed of semiconductive carrier material and in which said resistor means comprise lineal piezoresistive means composed of doping material in solution at said flexures and responsive to bending of said flexure sections in response to pressure to produce opposite changes in resistance in the respective resistor means by amounts corresponding to a pressure change.

25. In a pressure transducer as defined in claim 24, wherein said diaphragm is formed of a crystal of silicon with its crystallographic axis parallel to said flexures.

26. In a pressure transducer as defined in claim 22, wherein said gaps and islands are formed by anisotropic etching.

27. In a pressure transducer as defined in claim 22, wherein said diaphragm is composed of a thin silicon crystal of the N-type and the lineal piezoresistive means are rendered P-type by boron.

28. In a pressure transducer,
a diaphragm composed of insulating material and having a strain gauge area thereon, said gauge area being in a narrow rectangular thin flexure area between stiffening areas, said stiffening areas constraining said flexure area from bending along its length, and two semiconductive piezoresistive strain gauge elements formed at said flexure area, one having a current axis along the length of said flexure area and the other having its current flow axis transverse to said first mentioned current axis and to the length of said flexure area;
whereby pressure applied to said diaphragm deflects said flexure area about an axis along its length thereby causing the resistance of said first mentioned strain gauge to vary proportionately more than the resistance of said other strain gauge element.

29. In a pressure transducer,
a diaphragm composed of insulating material and having a strain gauge area thereon, said gauge area being in a narrow rectangular thin flexure area between stiffening areas, said stiffening areas constraining said flexure area from bending along its length, and two semiconductive piezoresistive strain gauge elements formed thereon, one said strain gauge element being formed at said flexure area having a current axis along the length of said flexure area;
whereby deflection of said diaphragm causes said flexure area to bend about an axis along its length whereby the resistance of said one strain gauge varies substantially with the pressure applied to said diaphragm, said other piezoresistive strain gauge element being so formed and arranged on the diaphragm that the resistance of said other strain gauge element does not vary substantially with the pressure applied to said diaphragm.

* * * * *